(12) United States Patent
Kuiper et al.

(10) Patent No.: US 12,130,434 B2
(45) Date of Patent: Oct. 29, 2024

(54) HEADS-UP DISPLAY APPARATUS

(71) Applicants: Alex Kuiper, Jimboomba (AU); Dean Dobson, Belmont (AU); Thomas Bedgood, Hamilton (AU)

(72) Inventors: Alex Kuiper, Jimboomba (AU); Dean Dobson, Belmont (AU); Thomas Bedgood, Hamilton (AU)

( * ) Notice: Subject to any disclaimer, the term of this patent is extended or adjusted under 35 U.S.C. 154(b) by 641 days.

(21) Appl. No.: 17/294,431

(22) PCT Filed: Nov. 19, 2019

(86) PCT No.: PCT/AU2019/051272
§ 371 (c)(1),
(2) Date: May 17, 2021

(87) PCT Pub. No.: WO2020/102851
PCT Pub. Date: May 28, 2020

(65) Prior Publication Data
US 2022/0019079 A1   Jan. 20, 2022

(30) Foreign Application Priority Data
Nov. 19, 2018  (AU) ................................ 2018904419

(51) Int. Cl.
*G02B 27/01*   (2006.01)
*G02B 3/04*    (2006.01)
*G02B 27/30*   (2006.01)

(52) U.S. Cl.
CPC ........... *G02B 27/0172* (2013.01); *G02B 3/04* (2013.01); *G02B 27/0149* (2013.01);
(Continued)

(58) Field of Classification Search
CPC ...... G02B 27/01; G02B 27/017; G02B 27/30; G02B 27/101; G02B 27/0172;
(Continued)

(56) References Cited

U.S. PATENT DOCUMENTS 7,418,170 B2    8/2008  Mukawa et al.
9,720,228 B2 *  8/2017  Harrison .............. G02B 3/0056
(Continued)

FOREIGN PATENT DOCUMENTS

WO    2015145395 A1   10/2015
WO    2020102851 A1    5/2020

OTHER PUBLICATIONS

PCT_AU2019051272_Written_Opinion_of_the_International_Searching_Authority_Jan. 24, 2020.
PCT_AU2019051272_International_Search_Report.

*Primary Examiner* — Sultan Chowdhury
(74) *Attorney, Agent, or Firm* — Hinckley, Allen & Snyder, LLP; Stephen Holmes

(57) ABSTRACT

A heads-up display apparatus adapted to be mounted to a helmet or item of headgear to display an image to a user includes a housing and an image projection system. The image projection system includes an electronic display, a display controller adapted to receive and process data presented on the electronic display, an aspherical lens, a semi-transparent display panel locatable in a line of sight of a user, and a front surface mirror for reflecting light emitted from the electronic display through the aspherical lens onto the semi-transparent display panel. The electronic display, the aspherical lens and the front surface mirror are arranged within the housing, and the heads-up display apparatus minimises refocusing of an eye of a user when looking from a primary task to the display and back to the primary task.

19 Claims, 7 Drawing Sheets

(52) U.S. Cl.
CPC ........ *G02B 27/30* (2013.01); *G02B 2027/011* (2013.01); *G02B 2027/014* (2013.01)

(58) Field of Classification Search
CPC .. G02B 27/0178; G02B 27/0179; G02B 3/00; G02B 3/02; G02B 3/04; G02B 30/56; G02B 2027/011; G02B 2027/014; G02B 2027/0127; G02B 2027/0141; G02B 2027/0156; G02B 2027/0198; H04N 5/64; B60K 35/00
See application file for complete search history.

(56) References Cited

U.S. PATENT DOCUMENTS

| | | | |
|---|---|---|---|
| 2003/0030912 A1* | 2/2003 | Gleckman | G02B 27/0172 359/638 |
| 2012/0097741 A1 | 4/2012 | Karcher | |
| 2016/0195723 A1* | 7/2016 | Murray | G02B 27/0172 359/631 |
| 2017/0007351 A1* | 1/2017 | Yu | G02B 27/0172 |
| 2017/0185214 A1* | 6/2017 | Kojima | G02B 27/017 |

\* cited by examiner

HEADS-UP DISPLAY APPARATUS

CROSS-REFERENCE TO RELATED APPLICATIONS

This application is related to and claims priority from earlier filed PCT Patent Application No. PCT/AU2019/051272, filed 19 Nov. 2019, and earlier filed Australian Patent Application No. 2018904419, filed 19 Nov. 2018.

BACKGROUND

The present disclosure relates to a heads-up display. In particular, embodiments of an invention disclosed herein relate to a heads-up display apparatus that can be mounted to a user's head or headgear and provide unobtrusive display in the field of view of the user.

Reference to background art herein is not to be construed as an admission that such art constitutes common general knowledge.

Some tasks, ranging from surgery to running to driving to construction and mining, require a user to remain focused on a task without moving their hands and/or eyes away from the task lest an accident or mistake occur. Such mistakes could be dangerous for the user or others in the area.

Displays incorporated into visors and head-mounted displays, such as digital display assistants for surgeons, are known and reduce the need for head movement of operators to refer to displays or charts. However, these displays are often mounted on the side of a surgeon's or user's head (as they would obstruct the view if placed in front of their face) and require the surgeon or user to glance away from the patient or task to refer to the display. This can be distracting and may lead to mistakes due to distraction.

Another form of a head-mounted display can be found in smart glasses. Smart glasses are a form of wearable computer glasses which display information alongside what the wearer sees through the lens of the glasses. However, these smart glasses can be difficult to use (such as with prescription glasses, for example), are fragile and include complex componentry with short battery life.

Thus, there is a need for an improved heads-up display.

OBJECT OF THE INVENTION

It is an aim of this disclosure to provide a heads-up display apparatus which overcomes or ameliorates one or more of the disadvantages or problems described above, or which at least provides a useful commercial alternative.

Other preferred objects of the present invention will become apparent from the following description.

SUMMARY OF THE INVENTION

In one form, although it need not be the only or indeed the broadest form, there invention resides in a heads-up display apparatus adapted to be mounted to a helmet or item of headgear to display an image to a user, the apparatus comprising:
  a housing;
  an image projection system, the image projection system comprising:
    an electronic display;
    an aspherical lens;
    a semi-transparent display panel attached to an external surface of the housing and locatable in a line of sight of a user; and
    at least one front surface mirror for reflecting light emitted from the electronic display through the aspherical lens onto the semi-transparent display panel for display to a user,
  wherein the electronic display, the aspherical lens and the front surface mirror are arranged within the housing; and
  a display controller adapted to receive and process data to be presented on the electronic display,
  whereby the heads-up display apparatus minimises refocusing of an eye of a user when looking from a primary task to the display and back to the primary task.

Preferably, the heads-up display apparatus is adapted to operate handsfree or without physical input from a user. Preferably, the heads-up display apparatus is adapted to graphically display data. Preferably, the heads-up display apparatus is adapted to display data without digital interaction or input (i.e. handsfree).

Preferably, the heads-up display apparatus comprises a collimating device adapted to collimate light emitted from the digital display of the display device to be viewed at infinity and thereby minimise focal readjustment of the user switching between viewing the display and another object. Preferably, the collimating device comprises an aspherical lens that is configured for the distance between the image projection system and the eye of a user whereby the image appears to be focused in the far field.

Preferably, the semi-transparent display panel comprises a half-silvered mirror or pellicle mirror. Preferably, the half-silvered mirror or pellicle mirror is edge-less or bezel-less having no discernible border or bezel observable by a user.

Preferably, the heads-up display apparatus comprises an attachment device to attach the display to a helmet or other piece of headgear and to allow the display to be adjusted for optimal viewing. Preferably, the attachment device is in the form of one or more clips or a mounting bracket.

Preferably, the electronic display comprises a liquid crystal display (LCD). Preferably, the LCD is approximately 12 mm in height and 24 mm in length to reduce the size of the optics required.

Preferably, the lens is located adjacent to the mirror and is suitably located between the mirror and the half-silvered mirror. Preferably, the lens is configured for the distance between the digital display and the lens, and the lens and an eye of a user to reduce optical distortion and to allow the entire display to be viewed from a typical distance between the eye and the lens.

Preferably, the half-silvered or pellicle mirror comprises a semi-transparent mirror or one-way mirror, wherein a mirrored surface of the half-silvered mirror is facing the lens to remove image distortion caused by reflection from a transparent substrate in front of the mirrored surface.

Preferably, the LCD is connected to a display controller having a microcontroller. Preferably, the display controller further comprises a radio receiver adapted to receive radio communications from an external source. Preferably, the display controller comprises a housing for housing the microcontroller and radio receiver. Preferably, the attachment device is located on an external surface of the housing of the display controller. Preferably, the housing is ruggedized. Preferably, the housing has an ingress protection (IP) rating of 67.

Preferably, the radio receiver comprises one or more of a Bluetooth receiver, a Wi-Fi receiver and a Long Range (LoRa) receiver.

In another form, the invention resides in a method for generating a heads-up display, the method comprising the steps of:

activating a first electronic display located in a housing attached to headgear to display an image; and reflecting the image from the first electronic display on a front surface mirror through an aspherical lens on to a semi-transparent display panel attached to the housing and located in a line of sight of a user.

Preferably, the method further comprises the step of receiving and processing data, via a display controller, to be displayed on the first electronic display.

Preferably, the apparatus further comprises a second front surface mirror arranged to receive light reflected from the front surface mirror and further arranged to reflect the light through the aspherical lens onto the semi-transparent display to a user.

Preferably, the front surface mirror, the second surface mirror, the electronic display and the aspherical lens are arranged in a pentaprism or pentamirror configuration. Preferably, whereby light emitted from the electronic display is reflected by the front surface mirror onto the second front surface mirror which reflects the reflected light through the aspherical lens.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE PREFERRED EMBODIMENTS

The following disclosure relates to a display and display device for mounting to headgear, such as a helmet, to display user-relevant digital information.

Figure 1:
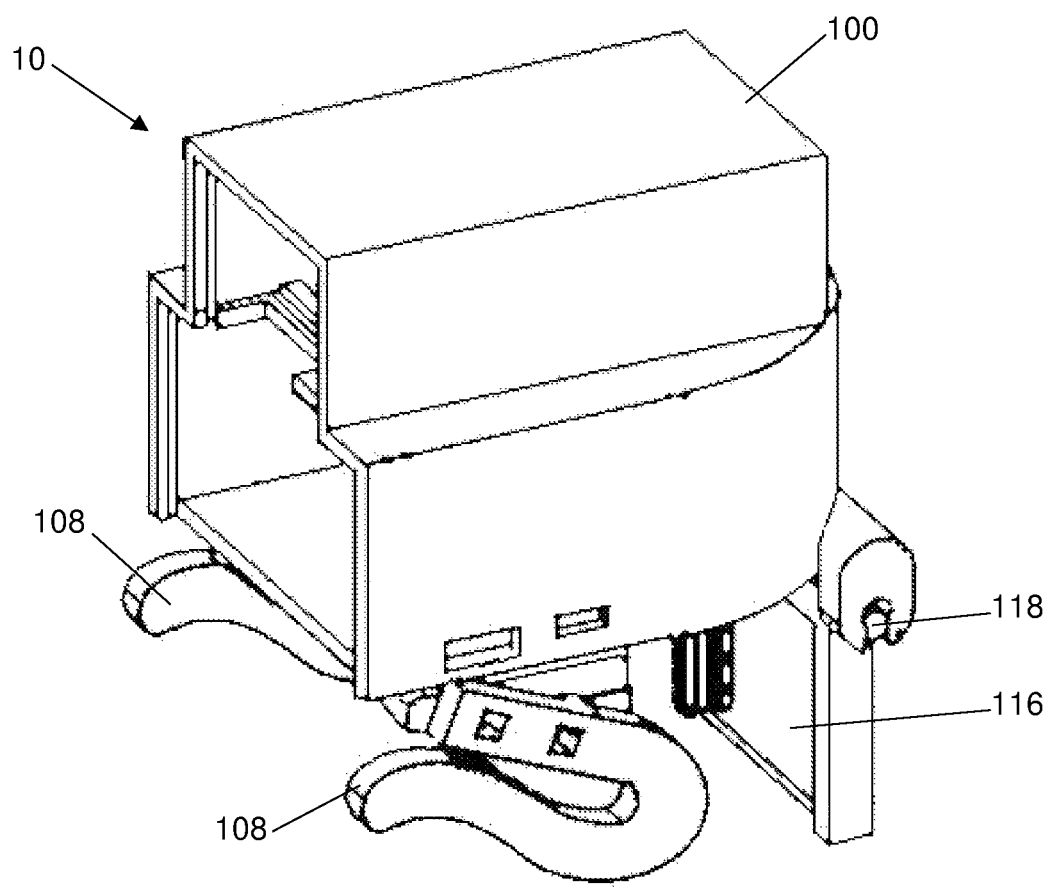
FIG. 1 illustrates a heads-up display apparatus for mounting to a helmet according to an embodiment of the present invention.
Figure 2:
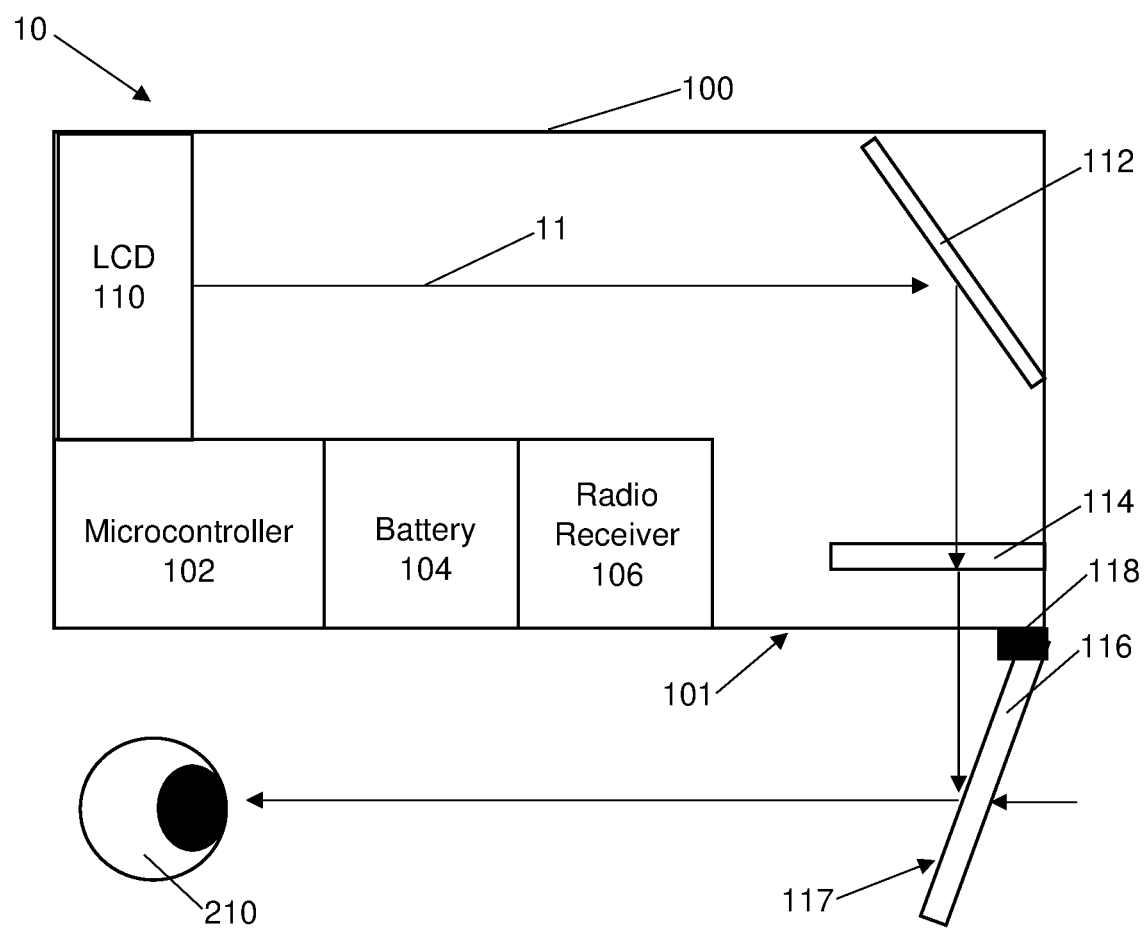
FIG. 2 illustrates a cross-section view of the heads-up display apparatus.
Figure 4:
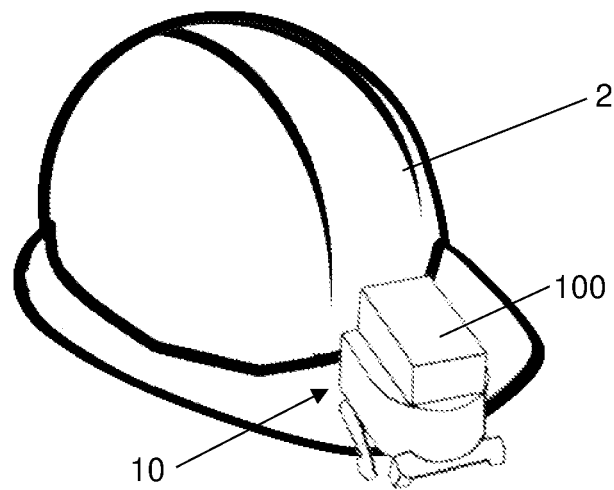
FIG. 4 illustrates a heads-up display apparatus mounted to a hard hat.

FIGS. 1 and 2 illustrate an embodiment of a heads-up display apparatus 10 to be mounted on headgear or a helmet 2 (as shown in FIG. 4).

The heads-up display apparatus 10 includes a housing 100 which houses a display controller in the form of a microcontroller 102, a battery 104 and a radio receiver 106 (which can be seen in FIGS. 2 and 3 and is explained below).

The housing 100 is a small waterproof (and preferably ingress protection 67 rated) box with a mounting bracket in the form of a clamp 108 that is suitable to clip onto headgear. The type of clip can be varied or interchanged to suit the type of hat or headgear being worn (for example, a small spring loaded or bolt clamp to attach to the brim of a construction hard hat).

Figure 3:
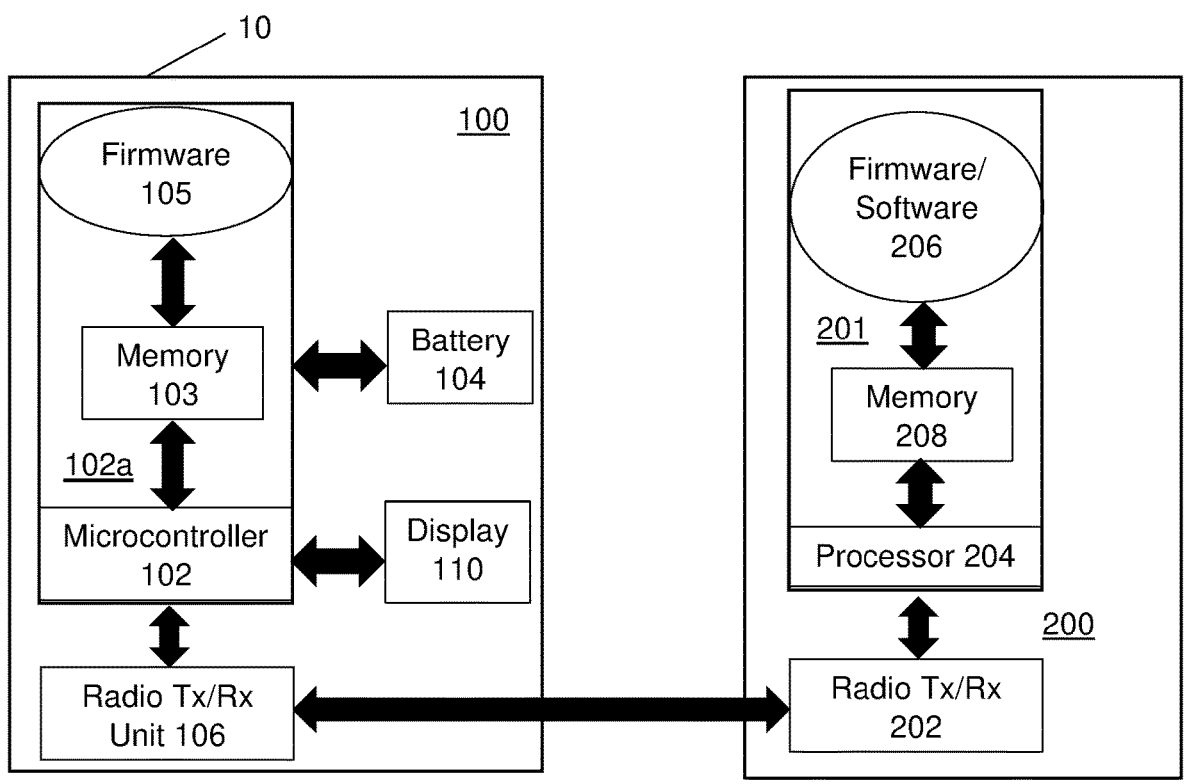
FIG. 3 illustrates a schematic diagram of the heads-up display apparatus.

Referring to FIGS. 2 and 3, the microcontroller 102 operates and controls the radio receiver 106 to establish radio communications with an external radio transmitter from a source 200. The radio receiver 106 can use both short- and long-range radio technology to receive data from the source 200. For example, the radio receiver 106 may have a Bluetooth receiver and/or a Long Range (LoRa) receiver. For situations requiring high bandwidth or communication with commonly used devices (such as smartphones or computers, for example), embodiments of the radio receiver may comprise a Bluetooth and WiFi receiver. Bluetooth and Wi-Fi are likely to be suitable when a data source is close-by (in the same or adjacent room, for example) but are unlikely to be sufficient for long range uses or high electrical noise environments (i.e. a factory environment or a user who is jogging). In such cases where a reliable connection is favoured over high bandwidth, a long range radio receiver (such as a LoRa receiver) is preferred.

In some embodiments, the radio receiver 106 may also be a radio transceiver to allow bidirectional communication between the display device and the source.

Remaining at FIG. 3, the source device 200 described herein may comprise a radio receiver/transceiver 202 connected to an application device having a controller board 201 having a processor 204 (e.g. a PC or smartphone) and executable software and firmware 206 installed thereon in digital memory 208 to extract and format the data to be sent to the display apparatus 10. Alternatively, a smartphone app could be used to format and send data to the display apparatus 10 in embodiments using Bluetooth or Wi-Fi as the radio technology.

Similarly, the apparatus 10 includes a microcontroller board 102a which includes microcontroller 102 that stores firmware 105 (or software) that accesses memory 103 containing instructions (such as data transfer protocol described above, for example).

Power is provided to the apparatus 10 by the rechargeable battery 104 (for example, a Lithium-Ion battery) which is recharged via a USB connection or similar using recharging circuitry optimised for the battery type.

Turning back to FIG. 2, the apparatus 10 is shown to also include a display system having a liquid crystal display (LCD) 110 located within the housing 100, a mirror in the form of a front surface mirror 112, an aspherical lens 114 and a semi-transparent display panel in the form of a half-silvered mirror display 116 (also commonly known as a pellicle mirror) attached to the outside of the housing 100 by an adjustable mechanism such as a ball and socket 118 (as shown), rotatable coupling or hinge. The ball and socket mechanism 118 is adjustable by the end user to suit the visibility of the half-silvered mirror display 116 as well as adjust obstruction to the user's peripheral vision.

The display apparatus 10 is adapted to allow a user to clearly read the half-silvered mirror display 116 without distraction and/or image distortion through the use of the lens 114 positioned between the LCD 110 and the half-silvered mirror display 116. The lens 114, which will be described in more detail below, changes the focal length of the display such that the user can view the display at infinity (i.e. the rays of light from the display are parallel) to reduce or eliminate the need for the eye of the user to refocus when looking from the outside task to the half-silvered mirror display 116 and back to the outside task.

The LCD 110 is an adjustable, high brightness backlit display which can overcome intense sunlight (such as being used in direct sunlight in outdoor areas, for example) and prevent the image or data being displayed from looking dull or washed out to a user. In some embodiments, the LCD 110 is in communication with a light sensor (not shown) positioned on the outside of the housing 100 (where it will be exposed to light) to automatically detect the amount of light and adjust the brightness of the LCD 110 to both conserve power and prevent the user from being dazzled by overly bright light emitted from the display when used in low light environments.

Remaining at FIG. 2 showing the interior of the housing 100 and optical path 11 of the apparatus 10, the light emitted from the LCD 110 travels along the optical path 11 within the housing 100 to the front surface mirror 112 which is angled (at approximately 45° from vertical) to reflect the light towards an opening 101 of the housing 100. Located within the opening 101 is the aspherical lens 114 that is specifically configured for the distance between the half-silvered mirror display 116 and the aspherical lens 114, and the aspherical lens 114 and the eye 210 to reduce optical distortion and so that the entirety of the half-silvered mirror display 116 can be seen from the typical distance between the eye 210 and the lens 114. As alluded to above, this particular arrangement reduces the focal length of the display so that the user can view the display with his/her eyes remaining focused in the far-field and without blurriness. It is important that the front surface mirror 112 is not a typical mirror having a reflective back surface with a transparent layer (such as glass) in front of the reflective surface as this can create double reflections and adversely affect the quality of the images displayed.

Figure 5:
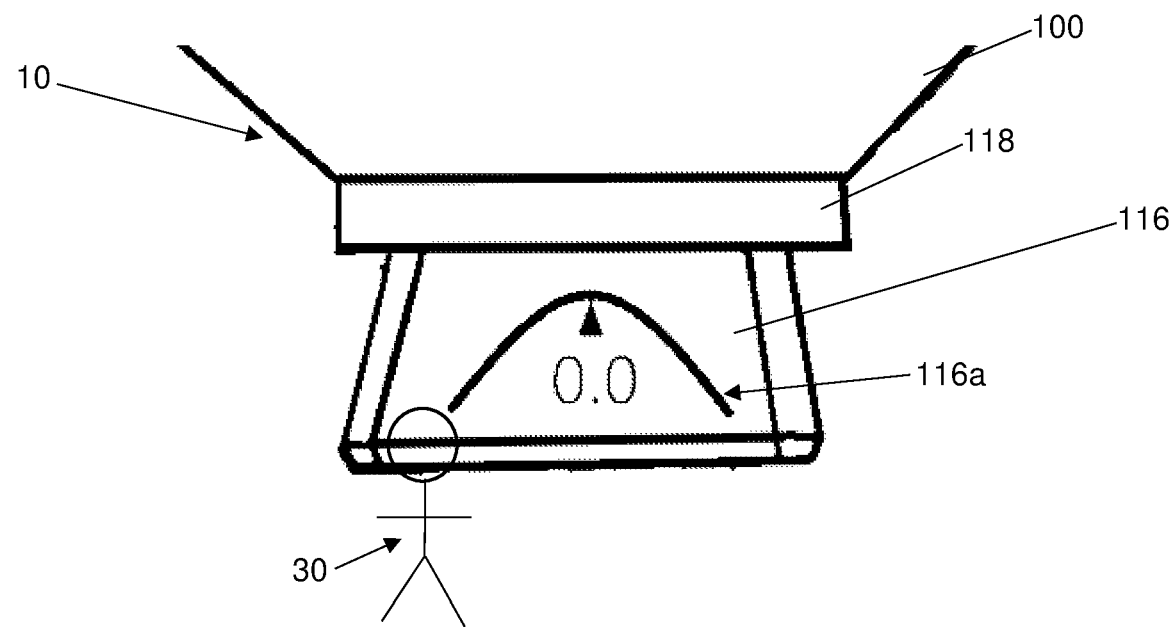
FIG. 5 illustrates a view of the display of the heads-up display apparatus from a wearer's perspective.

The half-silvered mirror 116 (a.k.a. a one-way mirror or pellicle mirror) receives the light reflected from the front surface mirror 112 and refracted and collimated through the lens 114 and acts as a heads-up display. This creates a type of holographic illusion for the display apparatus 10 such that the displayed image or text appears to hover about 1 metre in front of the user while still being see-through. The half-silvered mirror 116 is arranged so that a reflective, mirrored surface 117 of the half-silvered mirror 116 is facing the lens 114 to eliminate the occurrence of double reflections. In this arrangement, the reflective, mirrored surface 117 of the half-silvered mirror 116 reflects the light received from the LCD 110 and front surface mirror 112 to the user's eye 210 while also allowing light from behind the half-silvered mirror 116 to travel through the half-silvered mirror 116. This allows the user to see the objects behind the half-silvered mirror 116, thereby reducing obstructions to the user's view caused by the display apparatus 10. The result of the operation described above is illustrated in FIG. 5 where a person 30, who is some distance away from the heads-up display apparatus 10, can still be seen through the half-silvered mirror 116 which is displaying information 116a for the user.

Figure 6:
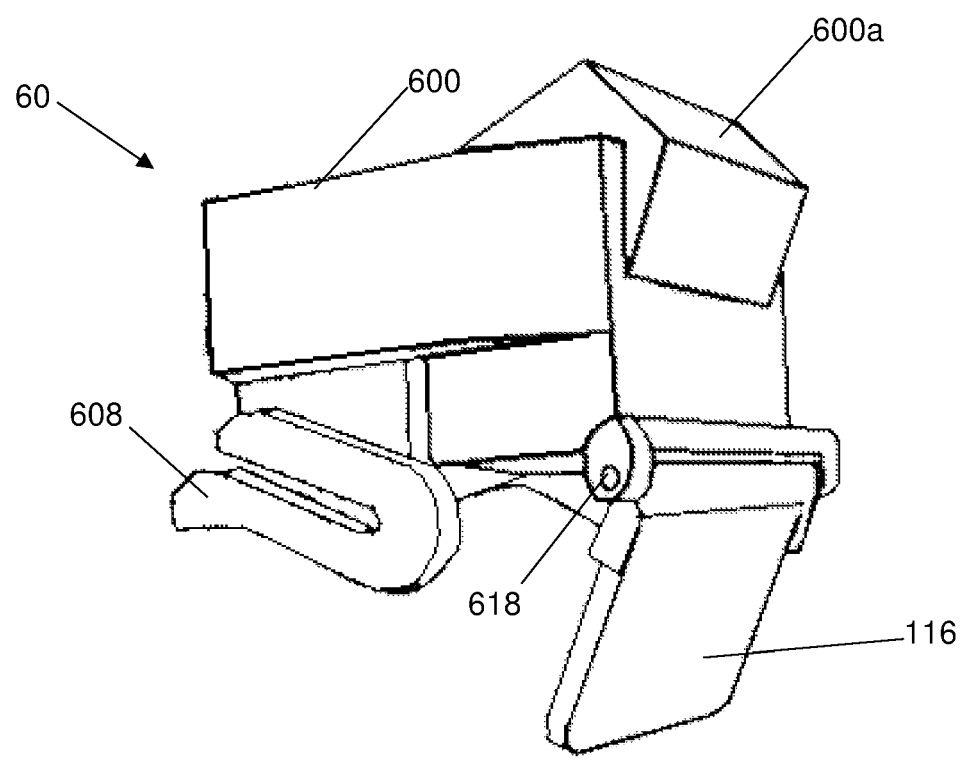
FIG. 6 illustrates a heads-up display apparatus for mounting to a helmet according to a second embodiment of the present invention.
Figure 7:
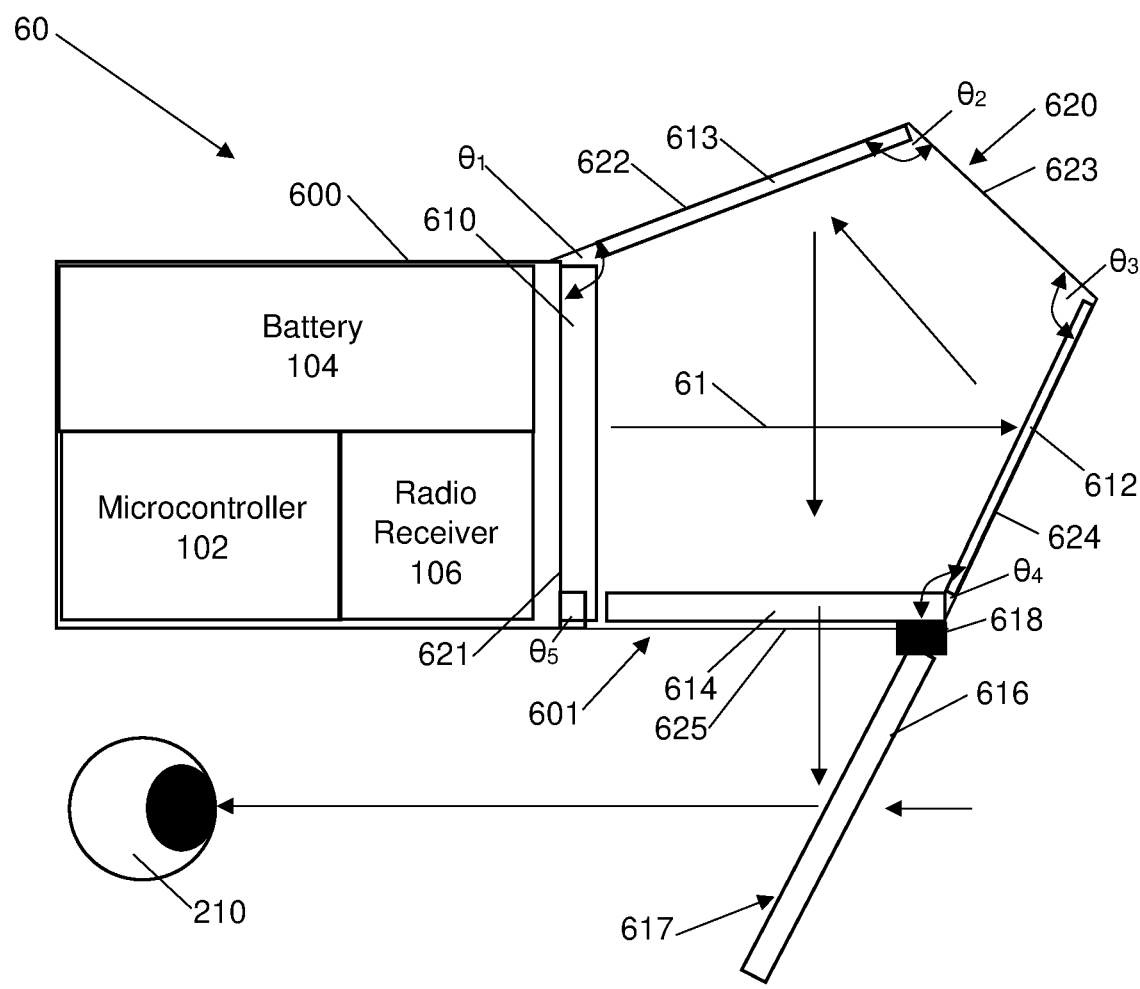
FIG. 7 illustrates a cross-section view of the heads-up display apparatus of FIG. 6.

Turning to FIGS. 6 and 7, there is illustrated a second embodiment of the invention in the form of a heads-up display apparatus 60 to be mounted on headgear or a helmet 2.

The heads-up display apparatus 60 includes a housing 600 which houses a display controller in the form of a microcontroller 602, a battery 604 and a radio receiver 606 (which can be seen in FIGS. 7 and 8 and is explained below). The display controller is substantially similar to the display controller described above in relation to heads-up display apparatus 10. However, housing 600 includes a pentaprismatic portion 620 located at an end of the housing 600. In cross-section, the pentaprismatic portion 620 can be thought of as being defined by five sides 621-625 (as shown in FIG. 7). The angle $\theta_1$ between side 621 and side 622 is approximately 112.5°. Angles $\theta_2$-$\theta_4$ are approximately equal to angle $\theta_1$ at 112.5°. Angle $\theta_5$ formed between side 621 and side 625 is substantially 90°.

The housing 600 is a small waterproof (and preferably ingress protection 67 rated) box with a mounting bracket in the form of a clamp 608 that is suitable to clip onto headgear. The type of clip can be varied or interchanged to suit the type of hat or headgear being worn (for example, a small spring loaded or bolt clamp to attach to the brim of a construction hard hat).

Figure 8:
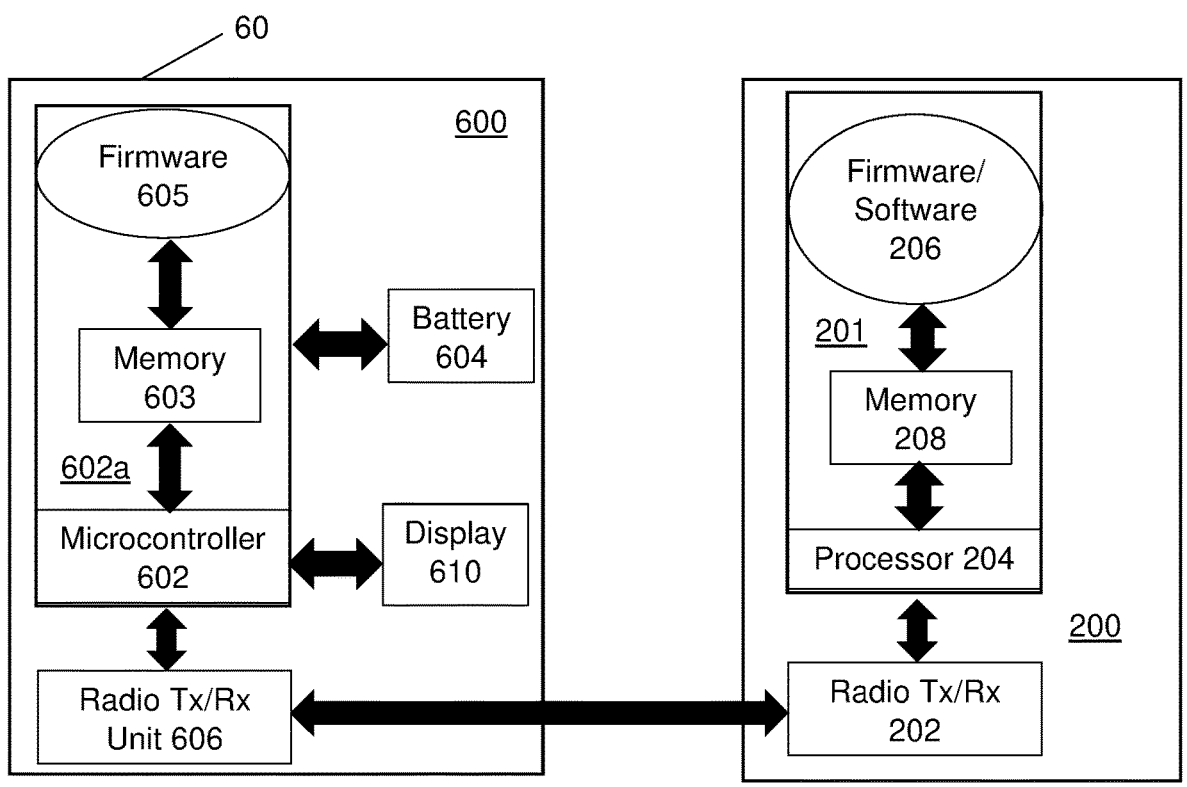
FIG. 8 illustrates a schematic diagram of the heads-up display apparatus shown in FIGS. 6 and 7.

Referring briefly to FIG. 8, the microcontroller 602 operates and controls the radio receiver 606 to establish radio communications with an external radio transmitter from a source 200. The radio receiver 606 can use both short- and long-range radio technology to receive data from the source 200. For example, the radio receiver 606 may have a Bluetooth receiver and/or a Long Range (LoRa) receiver. For situations requiring high bandwidth or communication with commonly used devices (such as smartphones or computers, for example), embodiments of the radio receiver may comprise a Bluetooth and WiFi receiver. Bluetooth and Wi-Fi are likely to be suitable when a data source is close-by (in the same or adjacent room, for example) but are unlikely to be sufficient for long range uses or high electrical noise environments (i.e. a factory environment or a user who is jogging). In such cases where a reliable connection is favoured over high bandwidth, a long range radio receiver (such as a LoRa receiver) is preferred.

Power is provided to the apparatus 60 by the rechargeable battery 604 (for example, a Lithium-Ion battery) which is recharged via a USB connection or similar using recharging circuitry optimised for the battery type.

The apparatus 60 also includes a display system having a liquid crystal display (LCD) 610 located within the housing 600, two mirrors in the form of two front surface mirrors 612, 613, an aspherical lens 614 and a semi-transparent display panel in the form of a half-silvered mirror display 616 (also commonly known as a pellicle mirror) attached to the outside of the housing 600 by an adjustable mechanism such as a ball and socket 618 (as shown), rotatable coupling or hinge. The ball and socket mechanism 618 is adjustable by the end user to suit the visibility of the half-silvered mirror display 616 as well as adjust obstruction to the user's peripheral vision.

The two front surface mirrors 612, 613 are substantially similar in construction to front surface mirror 612 described above.

The display apparatus is adapted to allow a user to clearly read the display without distraction and/or image distortion through the use of the lens 614 positioned between the LCD 610 and the half-silvered mirror display 616.

The lens 614, which will be described in more detail below, changes the focal length of the display such that the user can view the display at infinity (i.e. the rays of light from the display are parallel) to reduce or eliminate the need for the eye of the user to refocus when looking from the outside task to the half-silvered mirror display 616 and back to the outside task.

The LCD 610 is an adjustable, high brightness backlit display which can overcome intense sunlight (such as being used in direct sunlight in outdoor areas, for example) and prevent the image or data being displayed from looking dull or washed out to a user. In some embodiments, the LCD 610 is in communication with a light sensor (not shown) positioned on the outside of the housing 600 (where it will be exposed to light) to automatically detect the amount of light and adjust the brightness of the LCD 610 to both conserve power and prevent the user from being dazzled by overly bright light emitted from the display when used in low light environments.

With reference to FIG. 7 showing the interior of the housing 600 and optical path 61 of the apparatus 60, it will be appreciated the display system is arranged in a pentaprism or pentamirror configuration.

Thus, the light emitted from the LCD 610 (located on side 621) travels along the optical path 61 within the housing 600 to the first front surface mirror 612 (located on side 624) which is angled to reflect the light towards the second front surface mirror 613 located along a ceiling (side 622) of the housing 600. As noted above, the first front surface mirror 612 is mounted at approximately 112.5° relative to the lens 614 or opening 601.

The light reflected from the first front surface mirror 612 then travels to and is reflected by second front surface mirror 613 toward an opening 601 (defined side 625 of the pentaprism) of the housing 600. The second front surface mirror 613 is also mounted at approximately 112.5° relative to the LCD 610.

Located within the opening 601 is the aspherical lens 614 that is specifically configured for the distance between the half-silvered mirror display 616 and the aspherical lens 614, and the aspherical lens 614 and the eye 210 to reduce optical distortion. As a result, the entirety of the half-silvered mirror display 616 can be seen from the typical distance between the eye 210 and the lens 614.

As alluded to above, the particular arrangement described reduces the focal length of the display so that the user can view the display with his/her eyes remaining focused in the far-field and without blurriness.

It is important that the front surface mirrors 612, 613 are not typical mirrors having a reflective back surface with a transparent layer (such as glass) in front of the reflective surface as this can create double reflections and adversely affect the quality of the images displayed.

The half-silvered mirror 616 (a.k.a. a one-way mirror or pellicle mirror) receives the light reflected from the second front surface mirror 613 which is refracted and collimated through the lens 614 and acts as a heads-up display and creates a holographic illusion for the display apparatus 60 such that the displayed image or text appears to hover about 1 metre in front of the user while still being see-through. The half-silvered mirror 116 is arranged so that the reflective, mirrored surface 617 of the half-silvered mirror 116 is facing or orientated towards the lens 614 to eliminate the occurrence of double reflections. In this arrangement, the reflective, mirrored surface 617 of the half-silvered mirror 616 reflects the light received from the LCD 610 and front surface mirrors 612, 613 to the user's eye 210 while also allowing light from behind the half-silvered mirror 116 to travel through the half-silvered mirror 616 and thus enable the user to see the objects behind the half-silvered mirror 616, thereby reducing obstructions to the user's view caused by the apparatus 60.

The provision of two front surface mirrors, as opposed to one, reduces the size of the optics inside the housing. More particularly, arranging the two mirrors in a pentaprism like configuration reduces the physical size of the optical tunnel without having to reduce the optical length or optical distance.

Returning to FIG. 8, the source device 200 described herein may comprise a radio receiver/transceiver 202 connected to an application device having a controller board 201 having a processor 204 (e.g. a PC or smartphone) and executable software and firmware 206 installed thereon in digital memory 208 to extract and format the data to be sent to the display apparatus 60. Alternatively, a smartphone app could be used to format and send data to the display apparatus 60 in embodiments using Bluetooth or Wi-Fi as the radio technology.

Similarly, the apparatus 60 may have a microcontroller board 602a which includes microcontroller 602 that stores firmware 605 (or software) that accesses memory 603 containing instructions (such as data transfer protocol described above, for example).

In some embodiments, the half-silvered mirror may be replaced with a full-silvered mirror (which blocks all light from behind the display and increases light transmission from the display to the eye of the user) for very bright environments. Alternatively, a photochromic layer (similar to that used in light adaptive or "transition lenses") may be applied to the back or externally facing side of the half-silvered mirror to block out more light from behind the display to increase contrast and improve visibility in very bright environments.

In the illustrated embodiments, the half-silvered mirror is defined along its sides by a bezel. However, it will be appreciated that the half-silvered mirror may be bezel-less in order to improve user visibility behind the mirror.

In some embodiments, the brightness of the LCD can be varied by the microcontroller through the use of pulse width modulation to reduce the average current to the backlight and thereby preserve power.

Furthermore, in addition to the above, a non-reflecting treatment or layer may be applied to the eye-facing surfaces of the display to improve display contrast and readability.

In operation, when the radio receiver 106, 606 receives data from the source module 200, the microcontroller 102, 602 checks if the data structure is in the correct format and if the channel is correct. If not, the data is rejected and the microcontroller 102, 602 resumes waiting for the next data packet.

If the data structure and the channel are correct, the microcontroller 102, 602 processes the data, formats the data and displays it on the display screen through the process described above.

In the described embodiments, there is no power switch or button (although these may be included in some further embodiments), the microcontroller 102, 602 samples the radio transmissions on a regular basis for valid data from the source unit 200 and when data for the listening channel is found, switches on the display. As an addition or alternative form of input, embodiments of the invention may be configured to detect head/eye movement to control menus and operation selection on the display.

In some embodiments, software executed by the microcontroller 102, 602 will engage low power mode when there are no received communications for greater than a specified length of time, which will conserve battery power.

In some embodiments, a visual indicator may show when the unit is active and receiving valid data along with the signal strength, the channel it is listening to and a battery power remaining indicator.

In some embodiments, a data transfer protocol is used to ensure the correct information is received for the display module and is resilient to errors in transmission. In some particular embodiments, the data transfer protocol includes a preamble to identify the data as valid along with a channel identifier, which are used in addition to the standard data protection mechanisms available in a LoRa transmission.

In some embodiments, the LCD is approximately 12 mm in height and 24 mm in length to reduce the size of the optical equipment required.

Advantageously, the heads-up display facilitates the supply of digital information to a wearer that augments their activities across many general use cases including vocational and recreational use. Furthermore, this information can be accessed and displayed without the wearer's input (i.e. hands-free).

In another advantage of embodiments of the invention, the positioning of the heads-up display which is substantially in front of the wearer allows the wearer to avoid distraction and/or loss of retinal focus which can be caused by having to look away from the primary task to refer to a remote display.

The transparent nature of the display also reduces distraction and visual obstruction for the wearer. In particular, the adjustable see through mirror which acts as the display allows the operator to see both the digital data as well as the environment behind the mirror, which minimises the partial vision loss due to obstruction by the display. To the operator it appears that the display is transparent, holographic and hovering a short distance in front of their eye.

Embodiments of the invention also further reduce the loss of retinal focus through the use of a lens to adjust the focal length of the display.

In yet another advantage, embodiments of the invention can be used while the wearer is wearing prescription glasses or safety glasses without impacting the quality of the display.

In summary, embodiments of the present invention relate to a means of conveying data to the wearer of a construction hard hat or similar headgear to be used in environments where it isn't convenient or possible to use alternate methods of digital display (e.g. a smartphone, tablet or laptop), and where the operator has to keep their hands free and sight focused primarily on their work item. A typical use case (but not exclusive) is a construction hard hat for use on a construction or mine site. A long range radio connection is used between the display and a remote digital system where the remote system will format the information for presentation to the display wearer including possibility of video and audio.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A heads-up display apparatus adapted to be mounted to a helmet or item of headgear to display an image to a user, the apparatus comprising:
   a housing;
   an image projection system, the image projection system comprising:
      an electronic display;
      an aspherical lens;
      a semi-transparent display panel attached to an external surface of the housing and locatable in a line of sight of a user; and
      a front surface mirror for reflecting light emitted from the electronic display through the aspherical lens onto the semi-transparent display panel for display to a user, wherein the electronic display, the aspherical lens and the front surface mirror are arranged within the housing; and
   a display controller adapted to receive and process data to be presented on the electronic display,
   whereby the semi-transparent display panel minimises refocusing of an eye of a user when looking from a primary task to the display and back to the primary task.

2. The heads-up display apparatus of claim 1, the heads-up display apparatus further comprising a collimating device adapted to collimate light emitted from the digital display of the display device to be viewed at infinity and thereby minimise focal readjustment of the user switching between viewing the display and another object.

3. The heads-up display apparatus of claim 2, the collimating device comprising an aspherical lens that is configured for the distance between the image projection system and the eye of a user whereby the image appears to be focused in the far field.

4. The heads-up display apparatus of claim 1, the semi-transparent display panel comprising a pellicle mirror.

5. The heads-up display apparatus of claim 4, wherein the pellicle mirror is edge-less or bezel-less having no discernible border or bezel observable by a user.

6. The heads-up display apparatus of claim 4, the pellicle mirror comprising a semi-transparent mirror or one-way mirror, wherein a mirrored surface of the pellicle mirror is facing the aspherical lens to remove image distortion caused by reflection from a transparent substrate in front of the mirrored surface.

7. The heads-up display apparatus in accordance with claim 4, wherein the pellicle mirror comprises a half silvered mirror.

8. The heads-up display apparatus of claim 1, wherein the aspherical lens is located adjacent to the mirror and is located between the mirror and the semi-transparent display panel.

9. The heads-up display apparatus of claim 1, wherein the aspherical lens is configured for a distance between the digital display and the aspherical lens, and the aspherical lens and an eye of a user to reduce optical distortion and to allow the entire display to be viewed from a typical distance between the eye and the aspherical lens.

10. The heads-up display apparatus of claim 1, wherein the electronic display is connected to the display controller having a microcontroller.

11. The heads-up display apparatus of claim 10, the display controller further comprising a radio receiver adapted to receive radio communications from an external source.

12. The heads-up display apparatus of claim 11, wherein the display controller, the microcontroller and the radio receiver are arranged within the housing.

13. The heads-up display apparatus of claim 1, the heads-up display apparatus further comprising an attachment device to attach the housing to a helmet or other piece of headgear and to allow the semi-transparent display to be adjusted for optimal viewing.

14. The heads-up display apparatus of claim 13, wherein the attachment device is in the form of one or more clips or a mounting bracket.

15. The heads-up display apparatus of claim 13, wherein the attachment device is located on an external surface of the housing.

16. The heads-up display apparatus of claim 1, wherein the electronic display comprises a liquid crystal display (LCD).

17. The heads-up display apparatus of claim 1, wherein the heads-up display apparatus is adapted to display data without digital interaction or input.

18. The heads-up display apparatus of claim 1, further comprising a second front surface mirror arranged to receive light reflected from the front surface mirror and further arranged to reflect the light through the aspherical lens onto the semi-transparent display to a user.

19. The heads-up display apparatus of claim 18, wherein the front surface mirror, the second surface mirror, the electronic display and the aspherical lens are arranged in a pentaprism or pentamirror configuration, whereby light emitted from the electronic display is reflected by the front surface mirror onto the second front surface mirror which reflects the reflected light through the aspherical lens.

* * * * *